US009361156B2

(12) United States Patent
Dodge et al.

(10) Patent No.: US 9,361,156 B2
(45) Date of Patent: *Jun. 7, 2016

(54) ADAPTIVE PARTITIONING FOR OPERATING SYSTEM

(71) Applicant: 223608 Ontario Inc., Waterloo, Ontario (CA)

(72) Inventors: Dan Dodge, Ottawa (CA); Attila Danko, Ottawa (CA); Sebastien Marineau-Mes, Ottawa (CA); Peter van der Veen, Ottawa (CA); Colin Burgess, Ottawa (CA); Thomas Fletcher, Ottawa (CA); Brian Stecher, Kanata (CA)

(73) Assignee: 2236008 ONTARIO INC., Waterloo, Ontario ( * ) Notice: Subject to any disclaimer, the term of this patent is extended or adjusted under 35 U.S.C. 154(b) by 255 days.

This patent is subject to a terminal disclaimer.

(21) Appl. No.: 13/776,465

(22) Filed: Feb. 25, 2013

(65) Prior Publication Data

US 2014/0245311 A1  Aug. 28, 2014

Related U.S. Application Data

(63) Continuation of application No. 11/216,795, filed on Aug. 31, 2005, now Pat. No. 8,387,052.

(60) Provisional application No. 60/662,070, filed on Mar. 14, 2005.

(51) Int. Cl.
  *G06F 9/46* (2006.01)
  *G06F 9/50* (2006.01)
  *G06F 9/48* (2006.01)

(52) U.S. Cl.
  CPC ............... *G06F 9/50* (2013.01); *G06F 9/4881* (2013.01); *G06F 9/4887* (2013.01)

(58) Field of Classification Search
None
See application file for complete search history.

(56) References Cited

U.S. PATENT DOCUMENTS

| 4,908,750 | A | | 3/1990 | Jablow |
| 5,068,778 | A | | 11/1991 | Kosem et al. |
| 5,528,513 | A | * | 6/1996 | Vaitzblit et al. ............... 718/103 |
| 5,530,860 | A | | 6/1996 | Matsuura |
| 5,745,778 | A | | 4/1998 | Alfieri |
| 5,812,844 | A | | 9/1998 | Jones et al. |

(Continued)

FOREIGN PATENT DOCUMENTS

| WO | WO 03/052597 A2 | 6/2003 |
| WO | WO 2004/019205 A2 | 3/2004 |

OTHER PUBLICATIONS

Krten, Rob, "*Getting Started with QNX 4: A Guide for Realtime Programmers*," PARSE Software Devices, 1999, pp. 13-24.

(Continued)

*Primary Examiner* — Adam Lee
(74) *Attorney, Agent, or Firm* — Brinks Gilson & Lione

(57) ABSTRACT

An adaptive partition scheduler is a priority-based scheduler that also provides execution time guarantees (fair-share). Execution time guarantees apply to threads or groups of threads when the system is overloaded. When the system is not overloaded, threads are scheduled based strictly on priority, maintaining strict real-time behavior. When the system is overloaded, threads are scheduled based priority of threads that are in a ready state and based on the available guaranteed processor time budget of the adaptive partition associated with each thread.

14 Claims, 10 Drawing Sheets

(56) References Cited

U.S. PATENT DOCUMENTS

| | | | |
|---|---|---|---|
| 5,845,116 A | 12/1998 | Saito et al. | |
| 5,912,888 A | 6/1999 | Walsh et al. | |
| 5,944,778 A | 8/1999 | Takeuchi et al. | |
| 6,003,061 A | 12/1999 | Jones et al. | |
| 6,108,646 A | 8/2000 | Mohri et al. | |
| 6,249,836 B1 | 6/2001 | Downs et al. | |
| 6,301,616 B1 | 10/2001 | Pal et al. | |
| 6,385,636 B1 | 5/2002 | Suzuki | |
| 6,385,638 B1 | 5/2002 | Baker-Harvey | |
| 6,415,333 B1 | 7/2002 | Vasell | |
| 6,560,628 B1 | 5/2003 | Murata | |
| 6,687,904 B1 | 2/2004 | Gomes et al. | |
| 6,754,690 B2 | 6/2004 | Larson | |
| 6,757,897 B1 | 6/2004 | Shi | |
| 6,785,889 B1 | 8/2004 | Williams | |
| 6,859,926 B1 | 2/2005 | Brenner et al. | |
| 6,874,144 B1 | 3/2005 | Kush | |
| 6,910,213 B1 | 6/2005 | Hirono et al. | |
| 6,931,639 B1 | 8/2005 | Eickemeyer | |
| 6,941,437 B2 | 9/2005 | Cook et al. | |
| 6,948,172 B1 | 9/2005 | D'Souza | |
| 6,950,848 B1 | 9/2005 | Yousefi'zadeh | |
| 6,957,431 B2 | 10/2005 | Bollella et al. | |
| 6,964,048 B1 * | 11/2005 | Isham | 718/104 |
| 6,988,226 B2 | 1/2006 | Koning et al. | |
| 7,028,298 B1 | 4/2006 | Foote | |
| 7,051,329 B1 | 5/2006 | Boggs et al. | |
| 7,058,951 B2 | 6/2006 | Bril et al. | |
| 7,086,057 B2 | 8/2006 | Hayashi | |
| 7,100,161 B2 | 8/2006 | Latour | |
| 7,103,745 B2 | 9/2006 | Koning et al. | |
| 7,117,497 B2 | 10/2006 | Miller et al. | |
| 7,134,124 B2 | 11/2006 | Ohsawa et al. | |
| 7,222,343 B2 | 5/2007 | Heyrman et al. | |
| 7,269,713 B2 * | 9/2007 | Anderson et al. | 712/214 |
| 7,302,685 B2 | 11/2007 | Binns et al. | |
| 7,380,039 B2 | 5/2008 | Miloushev et al. | |
| 7,383,548 B2 | 6/2008 | Boon et al. | |
| 7,421,691 B1 | 9/2008 | Hancock et al. | |
| 7,464,379 B2 | 12/2008 | Kanai et al. | |
| 7,472,389 B2 | 12/2008 | Smith et al. | |
| 7,475,399 B2 | 1/2009 | Arimilli et al. | |
| 7,478,149 B2 * | 1/2009 | Joshi et al. | 709/223 |
| 7,506,361 B2 | 3/2009 | Kegel et al. | |
| 7,512,950 B1 | 3/2009 | Marejka | |
| 7,562,362 B1 | 7/2009 | Paquette et al. | |
| 7,657,892 B2 | 2/2010 | Langen et al. | |
| 7,765,547 B2 | 7/2010 | Cismas et al. | |
| 7,900,206 B1 * | 3/2011 | Joshi et al. | 718/104 |
| 2002/0062435 A1 | 5/2002 | Nemirovsky et al. | |
| 2002/0078121 A1 | 6/2002 | Ballantyne | |
| 2002/0078194 A1 | 6/2002 | Neti et al. | |
| 2002/0083211 A1 | 6/2002 | Driesner et al. | |
| 2002/0120661 A1 * | 8/2002 | Binns et al. | 709/102 |
| 2002/0120665 A1 | 8/2002 | Alford et al. | |
| 2002/0178208 A1 | 11/2002 | Hutchison et al. | |
| 2002/0198925 A1 | 12/2002 | Smith et al. | |
| 2003/0009506 A1 * | 1/2003 | Bril et al. | 709/103 |
| 2003/0061258 A1 | 3/2003 | Rodgers et al. | |
| 2003/0061260 A1 | 3/2003 | Rajkumar et al. | |
| 2003/0069917 A1 | 4/2003 | Miller | |
| 2003/0084164 A1 | 5/2003 | Mazzitelli | |
| 2003/0088606 A1 | 5/2003 | Miller et al. | |
| 2003/0101084 A1 | 5/2003 | Otero Perez | |
| 2003/0154234 A1 | 8/2003 | Larson | |
| 2004/0078543 A1 | 4/2004 | Koning et al. | |
| 2004/0139431 A1 * | 7/2004 | Muller | 718/100 |
| 2004/0143664 A1 | 7/2004 | Usa et al. | |
| 2004/0186904 A1 | 9/2004 | Oliveira | |
| 2004/0216101 A1 | 10/2004 | Burky et al. | |
| 2004/0216113 A1 | 10/2004 | Armstrong et al. | |
| 2004/0226015 A1 | 11/2004 | Leonard et al. | |
| 2005/0004879 A1 | 1/2005 | Mathias et al. | |
| 2005/0010502 A1 | 1/2005 | Birkestrand et al. | |
| 2005/0081200 A1 | 4/2005 | Rutten et al. | |
| 2005/0081214 A1 | 4/2005 | Nemirovsky et al. | |
| 2005/0091387 A1 | 4/2005 | Abe | |
| 2005/0138168 A1 | 6/2005 | Hoffman et al. | |
| 2005/0210468 A1 | 9/2005 | Chung et al. | |
| 2005/0283785 A1 | 12/2005 | D'Souza | |
| 2006/0026594 A1 | 2/2006 | Yoshida et al. | |
| 2006/0080285 A1 | 4/2006 | Chowdhuri | |
| 2006/0117316 A1 | 6/2006 | Cismas et al. | |
| 2006/0130062 A1 | 6/2006 | Burdick et al. | |
| 2006/0143350 A1 | 6/2006 | Miloushev et al. | |
| 2006/0206881 A1 * | 9/2006 | Dodge et al. | 717/140 |
| 2006/0206891 A1 | 9/2006 | Armstrong et al. | |
| 2006/0212870 A1 | 9/2006 | Arndt et al. | |
| 2006/0218557 A1 | 9/2006 | Garthwaite et al. | |
| 2006/0225077 A1 | 10/2006 | Anderson | |
| 2006/0277551 A1 | 12/2006 | Accapadi et al. | |
| 2007/0061788 A1 | 3/2007 | Dodge et al. | |
| 2007/0061809 A1 | 3/2007 | Dodge et al. | |
| 2007/0226739 A1 * | 9/2007 | Dodge et al. | 718/102 |
| 2007/0271562 A1 | 11/2007 | Schumacher et al. | |
| 2008/0126547 A1 | 5/2008 | Waldspurger | |
| 2008/0196031 A1 * | 8/2008 | Danko | 718/102 |
| 2008/0235701 A1 | 9/2008 | Danko | |
| 2008/0307425 A1 | 12/2008 | Tripathi | |

OTHER PUBLICATIONS

"*QNX Operating System: System Architecture*," QNX Software Systems, Ltd., 1997, pp. 37-47.

Shen, Kai et al., "*Integrated Resource Management for Cluster-Based Internet Services*" ACM SIGOPS Operating Systems Review, 2002.

* cited by examiner

ADAPTIVE PARTITIONING FOR OPERATING SYSTEM

PRIORITY CLAIM

This application is a continuation of U.S. patent application Ser. No. 11/216,795, filed Aug. 31, 2005, and issued as U.S. Pat. No. 8,387,052, which claims the benefit of priority from U.S. Provisional Application No. 60/662,070, filed Mar. 14, 2005, each of which are incorporated herein by reference.

BACKGROUND OF THE INVENTION

1. Technical Field

This invention relates to operating systems management. In particular, this invention relates to adaptive partitioning for operating systems.

Fair-share scheduling is a scheduling strategy known in the art for operating systems in which the CPU usage is equally distributed among system users or groups, as opposed to equal distribution among processes. For example, if four users (A,B,C,D) are concurrently executing one process each, the scheduler will logically divide the available CPU cycles such that each user gets 25% of the whole (100%/4=25%). If user B starts a second process, each user will still receive 25% of the total cycles, but both of user B's processes will now use 12.5%. On the other hand, if a new user starts a process on the system, the scheduler will reapportion the available CPU cycles such that each user gets 20% of the whole (100%/5=20%). Other scheduling methods such as last-in-first-out (LIFO), round-robin scheduling, rate-monotonic scheduling, and earliest-deadline first scheduling are also known.

In a conventional fair-share scheduling system, a high priority workload response time can be low only because another lower priority workload response time is high. Low priority processes can tax a microprocessor's resources by consuming large quantities of CPU budget, which may leave little available CPU budget for processes that need to be run immediately, but are infrequently executed. In addition, untrusted applications may gain access to a CPU resource and create an infinite loop, starving other legitimate processes of their required CPU budgets. Therefore, a need exists for a scheduling strategy for an operating system that allows critical processes adequate access to system resources when needed.

2. Related Art

Fair-share scheduling is a scheduling strategy known in the art for operating systems in which the CPU usage is equally distributed among system users or groups, as opposed to equal distribution among processes. For example, if four users (A,B,C,D) are concurrently executing one process each, the scheduler will logically divide the available CPU cycles such that each user gets 25% of the whole (100%/4=25%). If user B starts a second process, each user will still receive 25% of the total cycles, but both of user B's processes will now use 12.5%. On the other hand, if a new user starts a process on the system, the scheduler will reapportion the available CPU cycles such that each user gets 20% of the whole (100%/5=20%). Other scheduling methods such as last-in-first-out (LIFO), round-robin scheduling, rate-monotonic scheduling, and earliest-deadline first scheduling are also known.

In a conventional fair-share scheduling system, a high priority workload response time can be low only because another lower priority workload response time is high. Low priority processes can tax a microprocessor's resources by consuming large quantities of CPU budget, which may leave little available CPU budget for processes that need to be run immediately, but are infrequently executed. In addition, untrusted applications may gain access to a CPU resource and create an infinite loop, starving other legitimate processes of their required CPU budgets. Therefore, a need exists for a scheduling strategy for an operating system that allows critical processes adequate access to system resources when needed.

SUMMARY

An adaptive partition system provides a method for scheduling in an operating system where the system creates one or more adaptive partitions including one or more threads or one or more group of threads in an operating system. The operating system specifies one or more adaptive partition parameters. The scheduler may designate one or more critical threads. The scheduler may assign each adaptive partition a CPU time budget as a percentage of an overall system budget and apply one or more minimum CPU percentage execution time guarantees to the threads or the groups of threads when the operating system is overloaded. The operating system may execute the threads if there is CPU budget available for use by the partition. The system calculates the CPU budget consumed by the adaptive partition over a sliding time window for all partitions. The system allows use of an additional amount of CPU budget for critical threads even when the adaptive partition comprising the critical thread has exhausted its CPU budget, and deducts amounts of CPU budget consumed by the adaptive partition, in a process known as microbilling.

The adaptive partition scheduler also provides a method for scheduling an adaptive partition which may include determining if one or more threads in a number of adaptive partitions including one or more threads in an operating system is critical. The operating system may evaluate an ordering function for the adaptive partitions to determine the thread with the highest value of the ordering function. The operating system executes the thread from the adaptive partition that has the highest value after evaluating the ordering function. The system applies the time spent executing the thread against a CPU budget of the thread's adaptive partition (known as microbilling), and may apply the time spent executing the thread against a critical time budget of the adaptive partition if and only if the thread is critical and if the thread would not have been scheduled if it had not been critical.

The adaptive partition scheduler provides a method for transferring status of a critical thread in a message-passing operating system, which may include sending a message from a thread in an adaptive partition to a server, where the adaptive partition has a CPU budget and a critical time budget. The server receives the message and may assign the priority level of the sending thread to the receiving thread. To avoid priority inversion, the scheduler may join the receiving thread to the adaptive partition of the sending thread and may begin billing the execution time of the receiving thread to the partition of the sending thread.

The adaptive partition scheduler also provides a method of prioritizing access to a mutex in a message-passing operating system, which may include determining, from a list of waiting threads, a waiting thread that is most likely to run next after a current thread in an adaptive partition, where the current thread is holding a mutex, and the waiting threads are waiting for the mutex. The scheduler may raise the priority level of the current thread in the adaptive partition to the priority level of the waiting thread most likely to run next after the current thread. The system calculates a CPU waiting time incurred by the current thread while the current thread is holding the mutex and charges the current thread's assigned CPU budget the amount of the CPU waiting time, where the current thread assigned CPU budget is charged until the CPU budget reaches zero. Finally, the system charges the waiting thread's assigned CPU budget a remaining CPU waiting time if the current thread assigned CPU budget reaches zero, where the remaining CPU waiting time is the difference between the CPU waiting time and the amount of CPU budget charged to the current thread.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
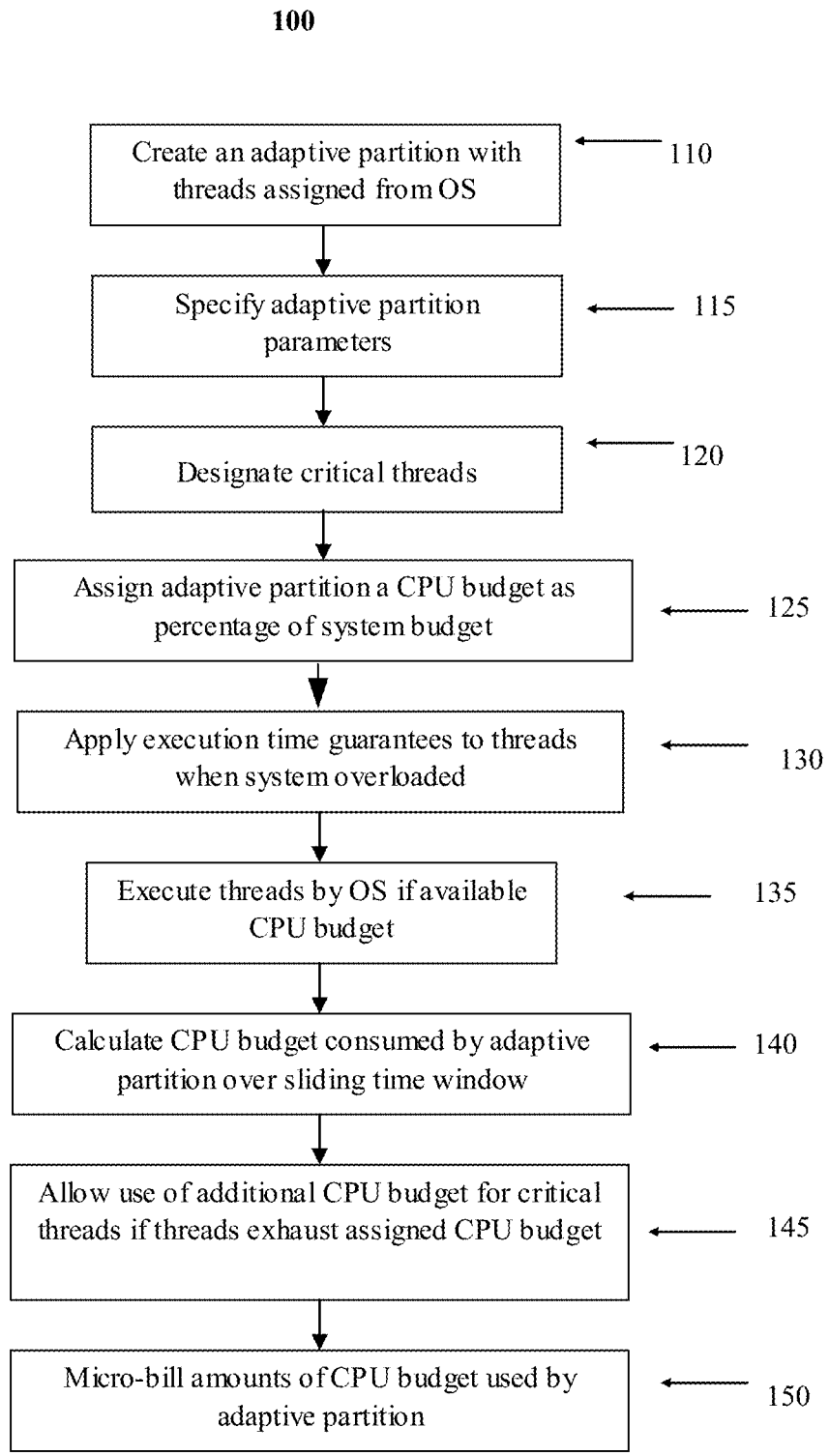
FIG. 1 is a flow diagram illustrating scheduling in an operating system.

FIG. 1 illustrates scheduling an adaptive partition 100. An adaptive partition is a set of threads that work on a common or related goal or activity. Like a static partition, an adaptive partition has a time budget allocated to it that limits its use of the CPU in an overload situation. Unlike a static partition, an adaptive partition: isn't locked to a fixed set of code in a static partition; behaves as a global hard real-time scheduler under normal load, but can still provide minimal interrupt latencies even under overload conditions; supports a dynamic environment, with shared components living outside the operating system's kernel; and maximizes CPU utilization.

As shown, at block 110, one or more adaptive partitions may be created comprising one or more threads or one or more group of threads in an operating system. The maximum number of partitions may be dynamically configured. Typically, the scheduler may be configured for a maximum of 16 adaptive partitions, though more partitions may be created as needed. One adaptive partition must be the system adaptive partition, where at least the idle thread and the process manager's threads exist. At boot time, the system designer may specify 115 the properties of the adaptive partitions, including: the list of processes that are initially part of each adaptive partition: the length of the averaging window, in milliseconds; the guaranteed CPU utilization (in percent) allocated to an adaptive partition; the maximum critical time budget of the adaptive partition; or the policy for how the system should respond should the adaptive partition exhaust its critical-time budget. The averaging window is the time over which the scheduler will try to keep adaptive partitions at their guaranteed CPU percentages, when the system is overloaded. A typical time is 100 milliseconds, though the designer may choose an appropriate averaging window as needed. The window size is specified only at boot time and is the same for all adaptive partitions.

A parent process in an adaptive partition may spawn, or generate, other processes or threads during operation. Child processes and threads inherit the adaptive partition of their parent process automatically. However, an API may be provided that will allow spawning threads into other adaptive partitions. This API may be made available only to code with sufficient privilege. For example, a system application launcher may have such privilege.

The size of the averaging window ("windowsize") is measured in clock ticks, which are converted internally to milliseconds. A clock tick is the interval at which the clock interrupt (the system timer) fires. Windowsize can range from a minimum of two ticks (typically 2 ms) to 255 ticks. Guaranteed CPU budget and critical time budgets are averaged by the same window size.

At block 120, critical threads may be designated. Critical threads may provide the ability for real-time behavior within these partitions. Designating a thread as critical gives it the ability to run immediately even if the adaptive partition's budget is exceeded. When this occurs, the adaptive partition is said to have gone into short-term debt. At boot time, the system designer may label selected adaptive partitions as critical and may give to each a critical time budget, specified in time units (for example, milliseconds). This is the amount of time all critical threads may use (above the specified partition's normal budget) during an averaging window. A critical thread will run even if its adaptive partition is out of budget, as long as the partition still has critical budget.

Next, an adaptive partition may be assigned a CPU budget as a percentage of the total system budget at block 125. The sum of all adaptive partitions' CPU percentages must always be 100%. For the purpose of assigning CPU shares, an SMP machine, regardless of the number of processors, is considered to be a single computer with 100% CPU to share out amongst its adaptive partitions. Therefore, engineering the parameters for adaptive partition scheduling is no different for an SMP machine than one with a single processor. Adaptive partition parameters may typically be set at boot time. However, the ability to modify them at runtime also may be available. This includes re-distributing the guaranteed CPU utilization between adaptive partitions, as well as modifying the critical time budget. The ability to modify adaptive partition parameters may only be made available to code with sufficient privilege.

As an added convenience, the designer may define a set of operating modes. A mode is a set of adaptive partition parameters. Modes may be typically specified at boot time. A runtime API allows the user to switch modes as needed. For example, a separate set of CPU-percentages may be needed during startup versus normal operations. These two modes would be set up, and the system may switch from one mode (the startup mode) to the next (normal operation mode) when initialization is complete. When the parameters of the set of adaptive partitions change at run time, for example because of a mode switch, it may take up to one averaging window for it to take effect.

At block 130, one or more minimum CPU percentage execution time guarantees may be applied to the threads or the groups of threads when the operating system is overloaded. This guarantees that the system will allocate a guaranteed CPU percentage as a resource for threads that are designated as critical. This necessarily may starve other threads for a period of time when the critical threads are executing, as a system design parameter.

Figure 2:
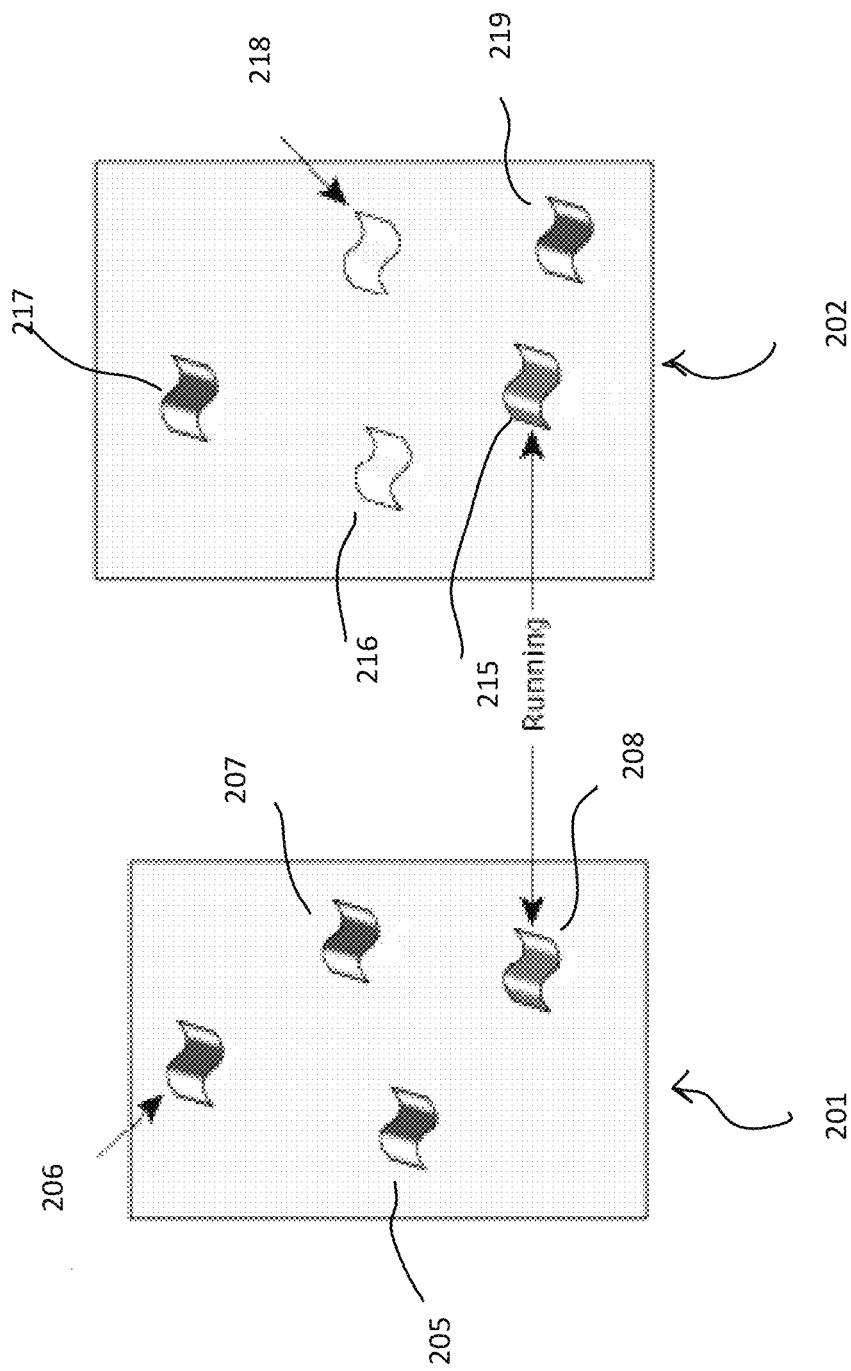
FIG. 2 is a flow diagram illustrating transferring the status of a critical thread in a message-passing operating system.

If there is available CPU budget during normal load operations (i.e., there is not a lack of system resources for allocation), then the operating system will execute threads assigned to a partition 135. Under normal load, the system may run a hard real-time scheduler. The highest-priority thread in the system may run immediately when it becomes ready (usually via an interrupt event). There is no delay imposed by a fixed timeslice partition scheduler (i.e., a scheduler that decides what to run next based on fixed time period allocations). In effect, CPU time is efficiently spent on those threads that most deserve it, without a timeslice partition scheduler introducing any scheduling latencies. FIG. 2 shows two adaptive partitions, a Multimedia application 201 and a Java application 202, each with a number of threads (205, 206, 207, 208, 215, 216, 217, 218, and 219) with different priorities. Neither partition is exceeding its CPU budget.

When the system is not overloaded, for example, if one adaptive partition chooses to sleep, the scheduler gives the CPU time to other adaptive partitions—even if the other adaptive partitions are over budget: if one adaptive partition has a thread with the highest priority, the scheduler hands out the "free" time to that thread. If two or more adaptive partitions have threads with the same highest priority, the scheduler divides the free time in proportion to the other adaptive partitions' percentages. This is necessary to prevent long ready-queue delay times in the case where two adaptive partitions have the same priority.

For example, suppose there are three adaptive partitions with 70%, 20% and 10% guarantees, ready threads at the same priority, and the system is overloaded. When the 70% adaptive partition goes to sleep, the scheduler hands CPU time out to the 20% and 10% adaptive partitions in a 2:1 ratio. If the sleeping adaptive partition sleeps for a short time (i.e. less than windowsize−percentage*windowsize milliseconds within one averaging window), then the scheduler may make sure that the sleeping partition will later get CPU time up to its guaranteed limit. That means that the 20% and 10% adaptive partitions in the example must pay back the time they utilized. If the sleeping adaptive partition sleeps for a long time, then some or all of the time given to other adaptive partitions may become free.

High-priority threads, running with the FIFO scheduling, that run for a long time, will be preempted when their adaptive partition runs out of budget. If a thread exhausts its budget in the middle of its timeslice, the scheduler may let the thread run to the end of its timeslice. This causes the adaptive partition to briefly run over budget.

The CPU budget consumed by the adaptive partition may be calculated by the scheduler over the sliding time window at block 140. If the threads in an adaptive partition have exhausted the assigned CPU budget and the threads are designated as critical, then the scheduler may allow use of additional CPU budget for the critical threads 145. Under heavy load, if an adaptive partition exceeds its CPU budget, then its highest-priority thread does not run until the partition once again has time available in its budget. This is a safeguard on the system that divides insufficient CPU time among the partitions. In this state, the processor runs the highest-priority thread in an adaptive partition with CPU time in its budget. When the system is overloaded, the scheduler balances adaptive partitions to within 1% of their guaranteed CPU percentages, or +/−timeslice/windowsize, whichever is greater.

Figure 3:
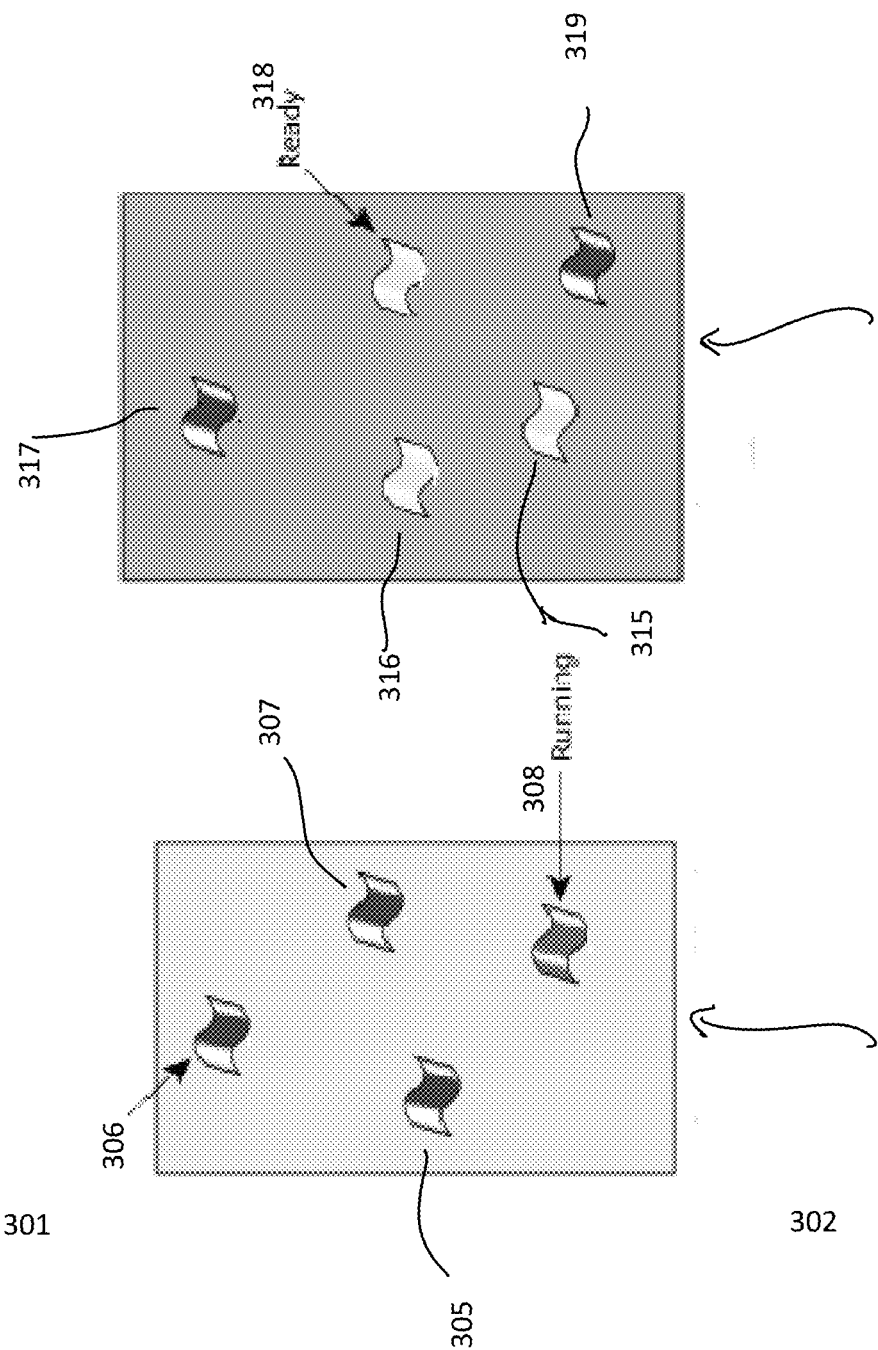
FIG. 3 is a flow diagram illustrating microbilling a critical thread's execution time.

FIG. 3 shows the same two partitions as FIG. 2, but in this case, the Java application 302 has exhausted its budget. The highest-priority thread 305 in the Multimedia application 301 is the only one that runs. A process may register to be informed when the system enters and leaves the overload state. The intention is that applications may use overload notification to gracefully degrade their service, for example, by skipping less important functions, or by reducing the precision of computation.

If all adaptive partitions are at their CPU limit, then the adaptive partition algorithm may specify that the highest-priority thread must be run. If two adaptive partitions have the same highest priority, then the adaptive partition that has used the least fraction of its budget may be run. This is needed to prevent long ready-queue delays that would otherwise occur. For example, if the window size is 100 ms, adaptive partition 1 is allotted 80% and has used 40 ms, and adaptive partition 2 is allotted 20% and has used 5 ms, and both partitions are at priority 10, adaptive partition 2 is run because its relative fraction free is 5 ms/20 ms, or 0.25, while adaptive partition 1's relative fraction free is 40 ms/80 ms or 0.50.

Overload or underload is a property of the whole system, not of a single adaptive partition. Adaptive partitions may legitimately go over budget when some other adaptive partition is sleeping. This is not by itself considered to be a system overload, and therefore does not trigger the overload-notification API.

The scheduler accounting may fully accumulate all of the CPU time spent executing by a thread. This may include, but is not limited to, time spent in interrupt handling threads, kernel execution time and partial timeslice execution. This is known as microbilling. Time spent by the idle thread is never billed. Time spent spin-locked on one processor while waiting to enter the kernel may be charged to the thread that is trying to enter the kernel. After the CPU budget has been calculated for the threads in an adaptive partition, the schedule microbills the amount of CPU budget used to the adaptive partition's assigned CPU budget at block 150.

Critical Threads

Under maximum system load, it may occur that certain partitions are using up their entire budget. Designating a thread as critical gives it the ability to run immediately even if the adaptive partitions' budget is exceeded. When this occurs, the adaptive partition is said to have gone into short-term debt.

At boot time, the system designer may label selected adaptive partitions as critical and give to each a critical time budget, specified in time units (for example, milliseconds). This is the amount of time all critical threads may use (above the specified partition's normal budget) during an averaging window. A critical thread will run even if its adaptive partition is out of budget, as long as the partition still has critical budget.

The system may automatically mark interrupt threads that are initiated by an I/O interrupt as critical. The designer also may specify a set of additional OS wakeup events, for example, timers, which may mark their associated handler threads as critical. An API also may allow designers to mark selected threads as critical.

Figure 4:
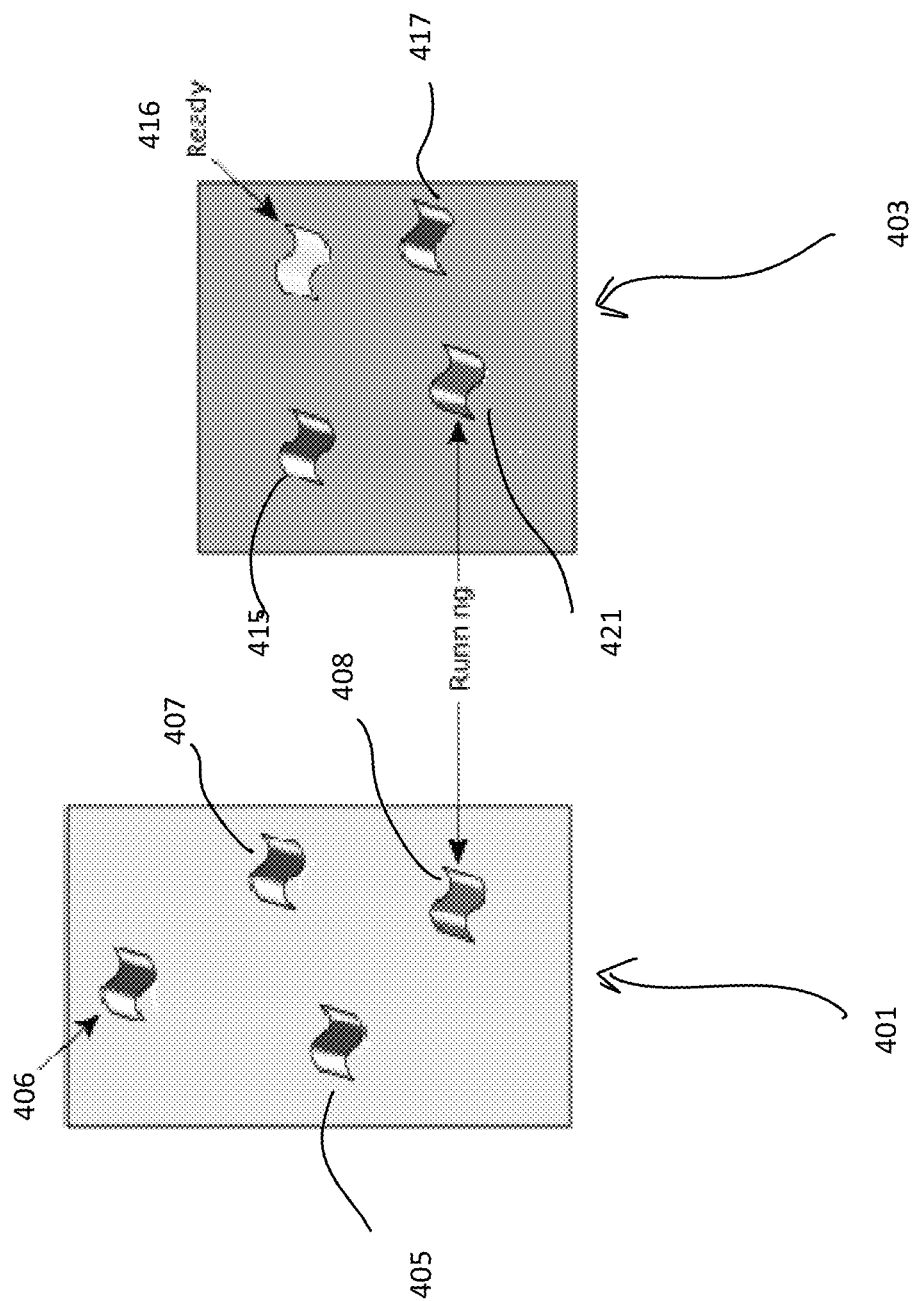
FIG. 4 is a flow diagram illustrating selecting an adaptive partition for execution.

In FIG. 4, an example of an adaptive partition, an Airbag Notification partition 403, is shown. The partition has exhausted its budget, but has a critical thread 421 that may be allowed to run anyway because of the importance that the system designer has placed on it. When the system schedules a critical thread, it may count the thread's run time against the thread's adaptive partition, but it counts the thread's time against the partition's critical budget only if the system would not have otherwise run the thread. This means that time spent in a critical thread time is not counted as critical when: the system is not overloaded; or the system is overloaded, but one or more adaptive partitions may not be using up their guaranteed CPU percentages.

A critical thread may remain critical until it enters a blocking state. That is, it may leave the running or ready state—this is typically because the threads are waiting for a message, interrupt notification, etc. The criticality of a thread, or billing to its adaptive partition's critical time budget, may be inherited along with the adaptive partition during operations which trigger priority inheritance.

The short-term debt is bounded by the critical budget specified on the partition. Over time, the partition may repay any short-term debt. A critical thread that exceeds the partition's critical budget (i.e. causes the partition to become bankrupt) is considered to be an application error, and the designer may specify the system's response. The choices for response are: 1) force the system to reboot; 2) notify an internal or external system watchdog; or 3) terminate or notify other designated processes.

The system may add an entry to its log if an adaptive partition exhausts its critical budget. In the case where the adaptive budgets are changed (through a mode change or through an API call to modify CPU percentages), the scheduler may never immediately declare any adaptive partition to be bankrupt (being over critical-budget).

Priority Inheritance and Server Threads

Figure 5:
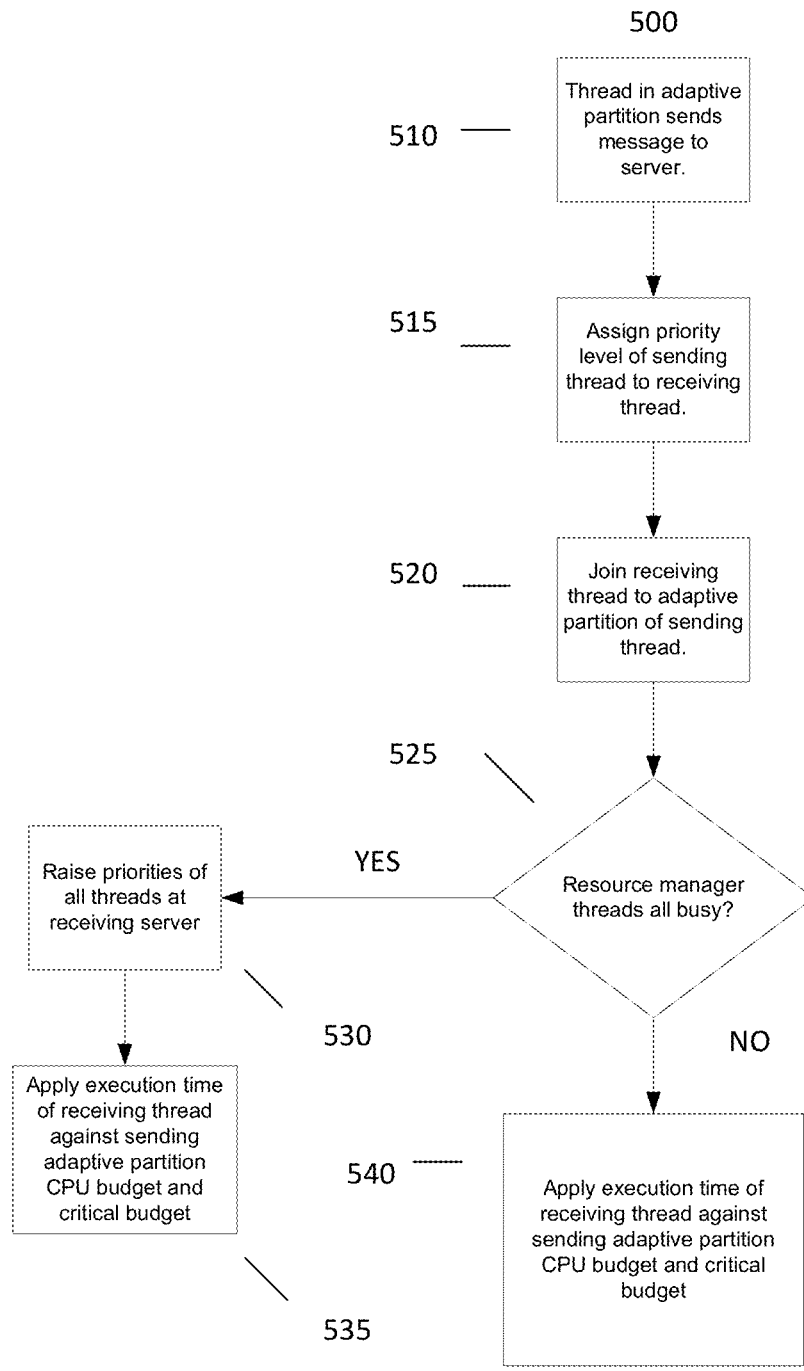
FIG. 5 is a flow diagram illustrating calculating the budget used by a critical thread.

FIG. 5 shows a method for transferring the status of a thread in message-passing operating system 500. In a message-passing operating system, when a thread sends a message to a server, the thread that receives the message may inherit the priority of the sending thread. This prevents priority inversion, because the server thread is doing work on behalf of the sending client. The thread in an adaptive partition may send a message to the server in block 510. The server may assign the priority level of the sending thread to the receiving thread. The server also may assign the criticality status of the sending thread to the receiving thread. In block 520, the receiving thread in the server joins the adaptive partition of the sending client.

Figure 6:
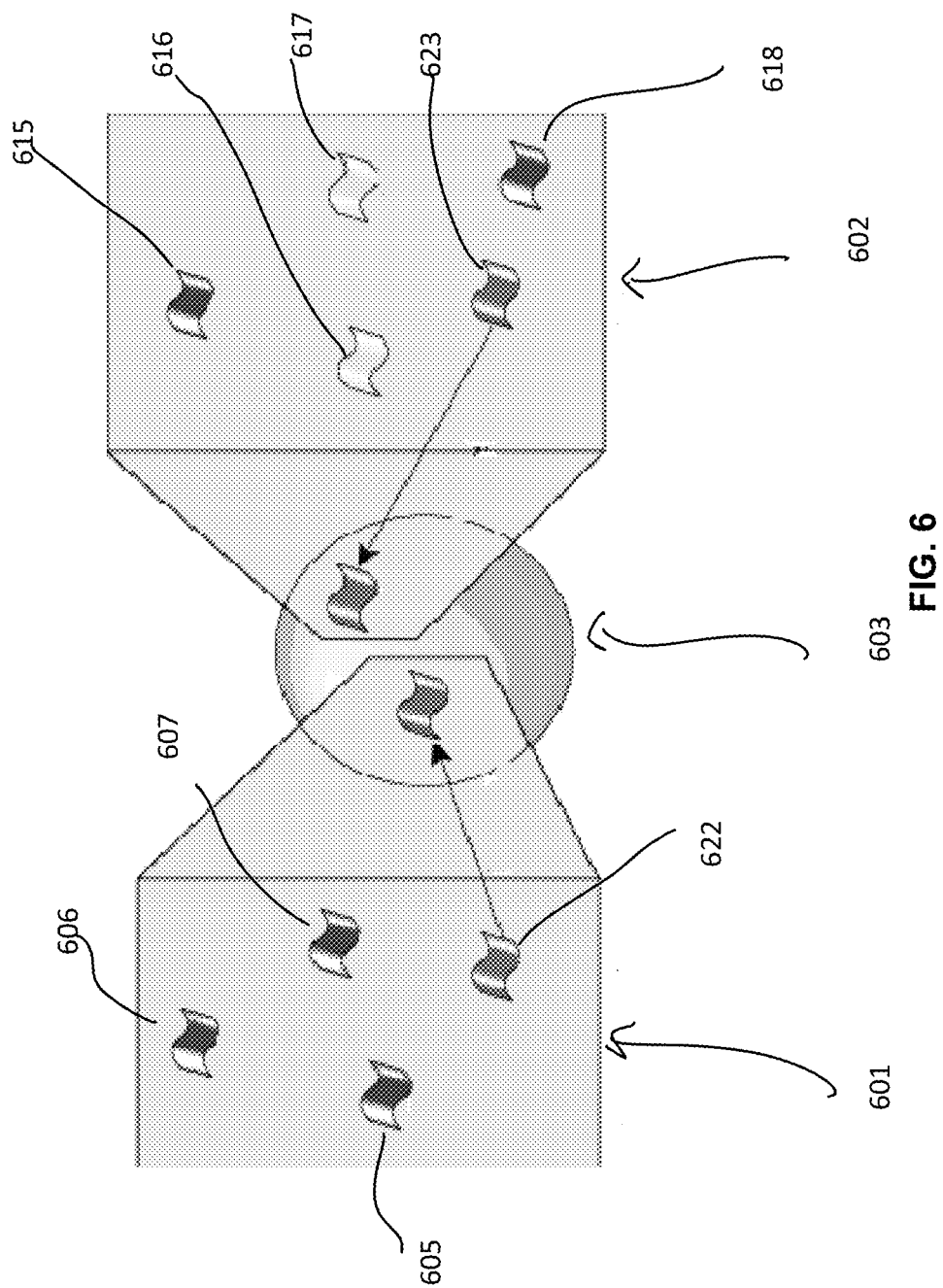
FIG. 6 is a flow diagram illustrating ordering access to mutexes.

FIG. 6 shows an adaptive partition sending messages to a server 603, a file system in this example. The server's designer may place the server's threads 622 and 623 into a partition with zero budget and default priority. The server threads 622 and 623 temporarily join the same partition as the sending threads and may run at the same priorities. Operations that currently provide a priority inversion avoidance mechanism may also be extended to inherit adaptive partitions. Message passing and mutexes are examples of this. Mutexes are used to prevent data inconsistencies due to race conditions. A race condition often occurs when two or more threads need to perform operations on the same memory area, but the results of computations depend on the order in which these operations are performed. mutexes may be used for serializing shared resources. Anytime a global resource is accessed by more than one thread the resource may have a mutex associated with it. One may apply a mutex to protect a segment of memory ("critical region") from other threads.

To avoid busy-server priority-inversion, for example when a client messages a resource manager whose server threads 622 and 623 are all busy with other clients (block 525 of FIG. 5), the manager currently may raise the priorities of all server threads 622 and 623 that wait on the same connection ID as the client 530. This is an attempt to get the server to hurry up, so it can serve the client. When this occurs, for all the server threads 622 and 623 whose priorities the resource manager may raise, the resource manager must now begin billing the new client. The scheduler applies the execution time of the receiving thread against the sending the adaptive partition's CPU budget and critical CPU budget if the resource manager threads are not all busy 540. If the resource manager threads are all busy and consequently, the scheduler had to raise the priorities of all threads at the receiving server 535, then the scheduler applies the execution time of all receiving threads in the server against the sending adaptive partition CPU budget and critical CPU budget.

Algorithms Scheduling

In adaptive partition scheduling, it is not enough to simply pick the highest priority thread with budget. Quite often, all adaptive partitions will exhaust their percentage budgets at the same time, and then the highest priority adaptive partition may be run. Also, when adaptive partitions have equal highest priorities, it may be desirable to split their time by the ratio of their guaranteed CPU percentages. Finally, critical threads may be run even if their adaptive partition is out of budget.

Figure 7:
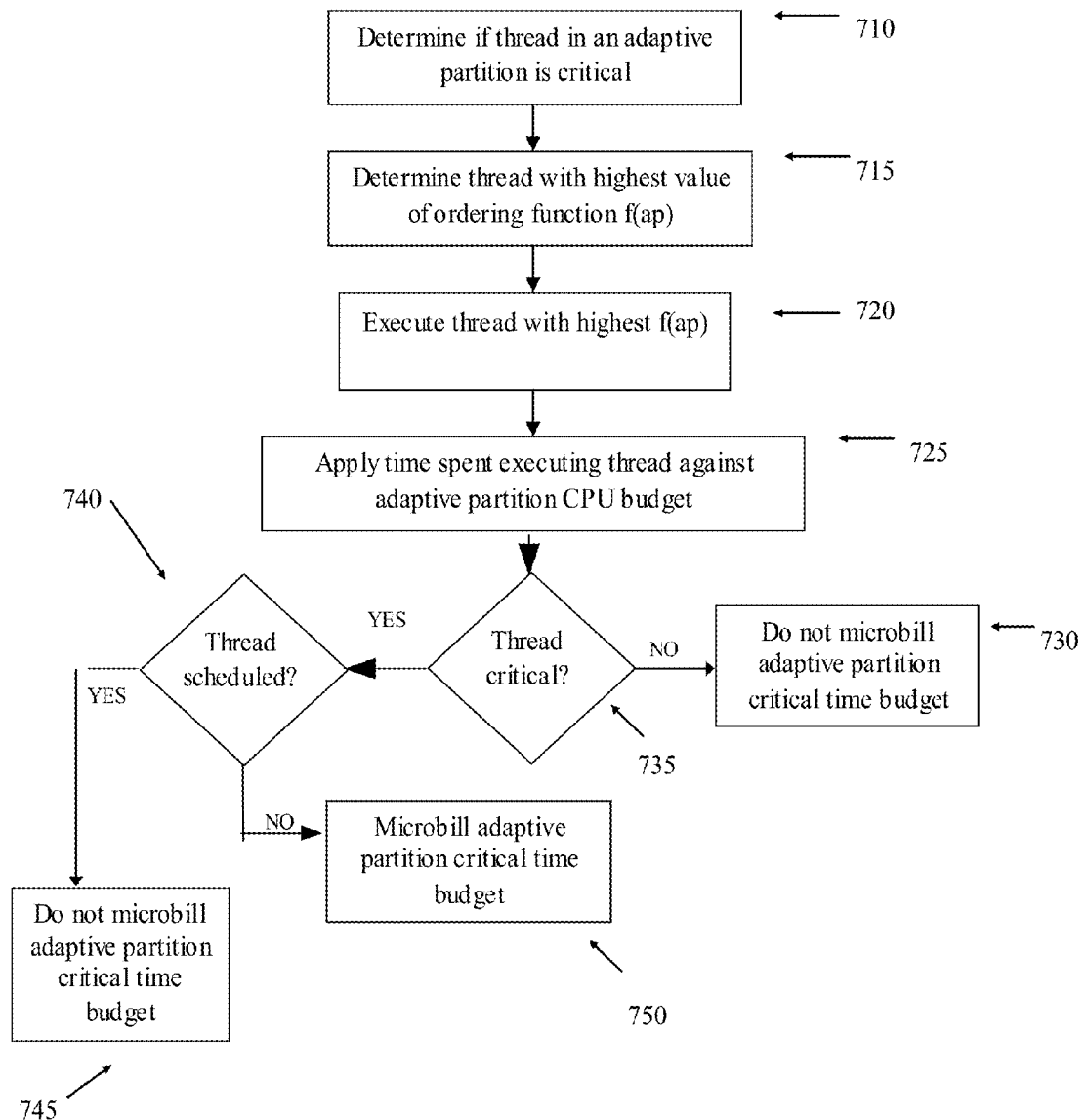
FIG. 7 is a schematic of an adaptive partition scheduling under normal load.

FIG. 7 shows a method of scheduling an adaptive partition 700. At block 710, the operating system determines if a thread in an adaptive partition is critical. A thread with the highest value of an ordering function f(ap) may be determined, where ap is the determined adaptive partition, at block 715. Next, the thread with the highest f(ap) is executed by the operating system 720. The time spent by the CPU executing the thread is applied against the thread's adaptive partition CPU budget, if the thread is non-critical, at block 725. If the thread is not critical 735, the thread's adaptive partition critical time budget may not be billed. If the thread is critical 735 and the thread was scheduled to run anyway 740, the thread's adaptive partition critical time budget is not microbilled for the thread's execution time 745. If and only if the thread is critical 735 but not scheduled 740 (and where the thread would not have been selected if not critical), then the thread's execution time is microbilled against the thread's adaptive partition critical time budget 750. This means computing the function: f_prime(ap)=ordered triplet (w,y,z), where w=has_budget (ap), and y and z have the same meanings as above. Then charge the time run by ap, selected in block 715, to that adaptive partition's critical budget if and only if f_prime(ap) is not ordered to be greater than f_prime of all other adaptive partitions using the same ordering rules as above.

Figure 8:
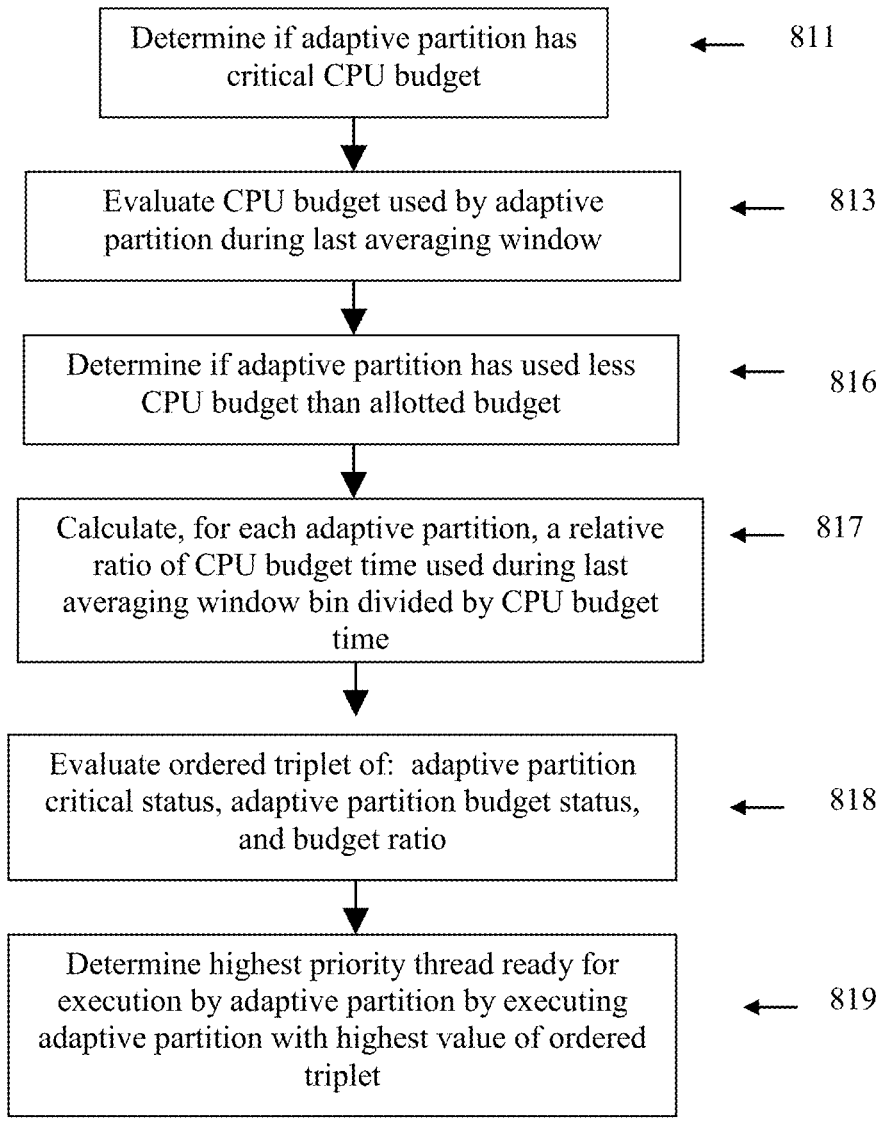
FIG. 8 is a schematic of an adaptive partition scheduling under overload.

FIG. 8 depicts a method 800 for evaluating the ordering function f(ap) described in block 715 of FIG. 7. To compute f(ap), let ap be an adaptive partition. Let "is_critcal(ap)→boolean" be a function that determines if an adaptive partition is permitted a critical budget. Let "has_budget(ap)→boolean" be a function that determines if an adaptive partition has consumed less CPU time, during the last averaging window time, than its defined budget. Let "highest_prio(ap)→integer" be a function that returns the highest priority of all ready-to-run threads in an adaptive partition. Let "relative_fraction_used(ap)→real" be a function that returns the ratio of the number of microseconds of CPU time consumed by the adaptive partition ap, during the last averaging windowsize milliseconds, divided by the budget of the adaptive partition ap when expressed in microseconds (not percent). The operating system determines if the adaptive partition has critical CPU budget available in block 811, determining the logical state of has_budget(ap). Then, the operating system evaluates the CPU budget used by the adaptive partition during the last averaging window 813. At block 816, the operating system determines if the adaptive partition has used less CPU budget than the adaptive partition's allotted budget. For each adaptive partition, the relative ratio of CPU budget time used during the last averaging window, divided by the assigned CPU budget time for that adaptive partition, is calculated at block 817.

Then, a function f(ap) is constructed which orders the ordered triplet (x,y,z), where x=is_critical(ap) OR has_budget(ap); y=has_budget(ap); and z=1-relative_fraction_used (ap). Then the function f(ap) is evaluated for all ap, choosing the ap that has the highest value of f(ap), where the ordering of the triplets (x,y,z) is defined numerically, with x being more significant than y or z and y being more significant than z, at block 818. The operating system then determines the highest priority thread ready for execution by the adaptive partition by computing the function f(ap) as above for the ordered triplet (w,y,z), where w=has_critical_budget(ap), y=has_budget(ap); and z=1-relative_fraction_used(ap) (block 819).

Computing the Relative Fraction Used

Figure 9:
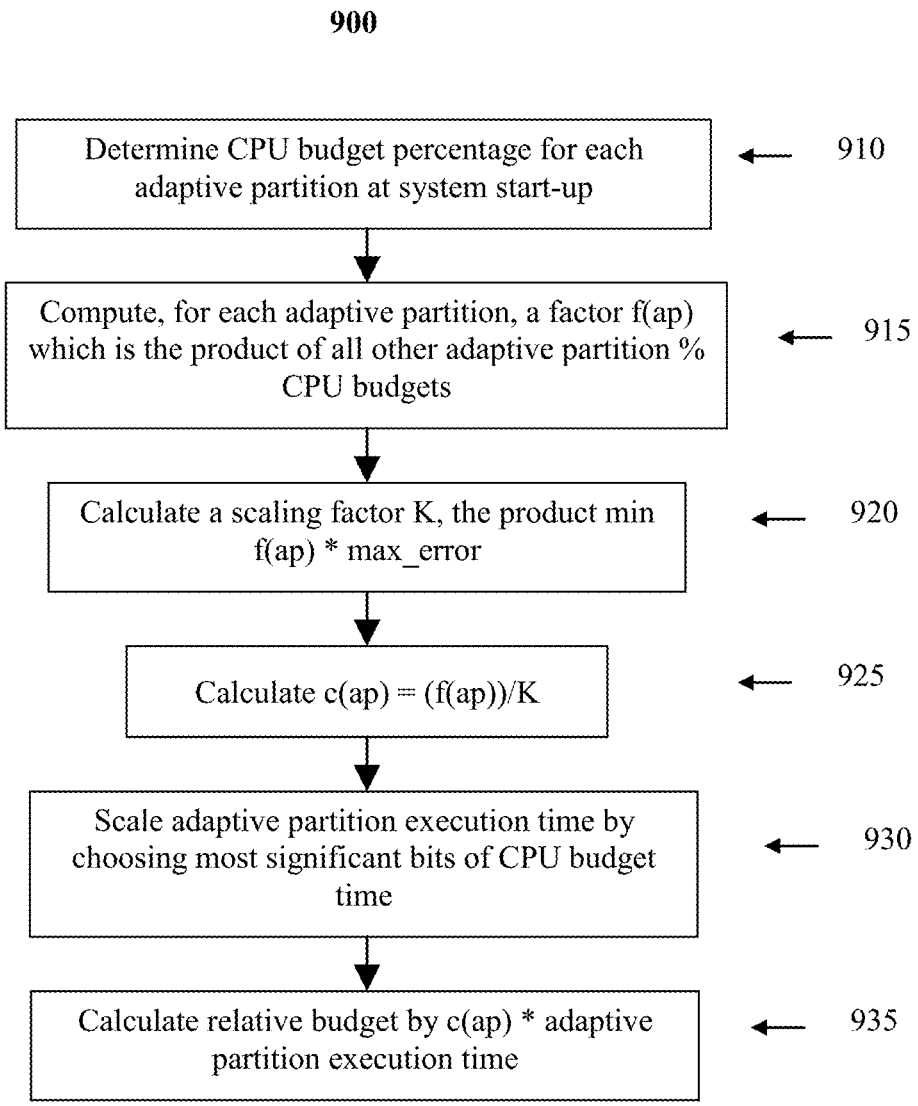
FIG. 9 is a schematic of critical threads processing by an adaptive partition scheduling.

FIG. 9 shows a method 900 for calculating the relative ratio of CPU budget time consumed during the last averaging window, as described in block 817 of FIG. 8. The application may include an efficient implementation of an algorithm which avoids the use of floating point division and large integer multiplies. To achieve this efficiency, the application may include balancing the CPU consumption of adaptive partitions to a manageable tolerance of error and then using a minimal number of bits to represent and carry out arithmetic with respect to CPU consumption and error tolerance.

The relative fraction used of an adaptive partition is the number of microseconds it ran during the last averaging window divided by its share of the averaging window in microseconds, or run/(windowsize*percentage). To avoid doing floating-point division at run time, the scheduler may instead compute a different number that has the same ordering properties as run/(windowsize*percentage) for each adaptive partition. Thus, a constant c(a) may be pre-computed so that the adaptive partition with the highest run*c(ap) also is the adaptive partition with the highest run/(windowsize*percentage).

This c(ap) may be precomputed, once per startup, in the process manager. At block 910, the CPU budget percentage for each adaptive partition may be determined at start-up. The operating system may compute, for each adaptive partition a factor, f(ap) to be the product of the percentage CPU budgets of all the other adaptive partitions 915. At block 920, if the maximum averaging error is max_error (e.g. 0.005 for ½ a percent), then k=min(list of f(ap))*max_error may be computed. Next, a constant scaling factor c(ap) is calculated as c(ap)=f(ap)/k 925. The value, run*c(ap) has the same ordering properties as run/(windowsize*percentage) within an error tolerance max_error.

To practically compare different adaptive partitions' relative fraction used, the scheduler may need to multiply the adaptive partitions' run time with c(ap). However the micro-billed times may be large numbers. To ensure only single-multiply instructions are used, the micro-billed times may be first scaled choosing a number of most significant bits of the CPU budget time 930. The degree of scaling is set by max_error. However, any reasonable choice for max_error (e.g. ¼ to ½%) can be satisfied by choosing only the most significant 16 bits of the microbilled run-time. So, in practice, the system may be calculating run>>32*cp(ap). At block 935, the relative budget ratio is calculated as c(ap)*(adaptive partition execution time).

An error tolerance of 0.5% to 0.25% is considered sufficient for an implementation. However, the application may include the notion that for any specified error tolerance, a minimal number of bits is chosen to both represent c(ap), the scaled value of the CPU time executed by adaptive partition ap, during the last averaging windowsize time, and the product of c(ap) and the scaled CPU time. The minimal number of bits is chosen for both representations and carrying out multiplies so that all representation and arithmetic errors are less than or equal to a chosen error tolerance.

Ordering Access to Mutexes

Mutexes may be used to prevent data inconsistencies due to race conditions. A race condition often may occur when two or more threads need to perform operations on the same memory area, but the results of computations depend on the order in which these operations are performed. Mutexes are used for serializing shared resources. Anytime a global resource is accessed by more than one thread the resource may have a mutex associated with it. The operating system may apply a mutex to protect a segment of memory ("critical region") from other threads. The application gives a mutex to threads in the order that they are requested. However, the application deals with the problem of when a low-priority thread, which may hold the mutex, unreasonably delays higher-priority threads which are waiting for the same mutex.

Figure 10:
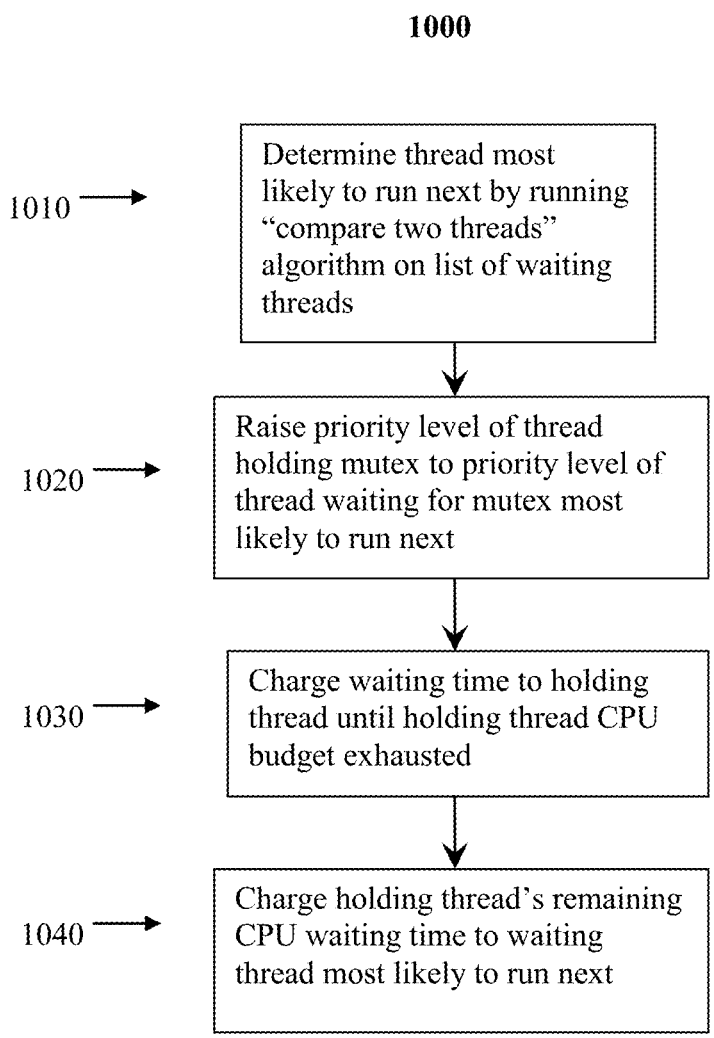
FIG. 10 is a schematic of processing of inheritance of priorities and partitions.

FIG. 10 shows a method for prioritizing access to a mutex in an adaptive partitioning system, when one thread may hold a mutex, and several other threads may be waiting for the same mutex 1000. When the thread holding the mutex runs out of budget, the scheduler begins billing the run time of the thread holding the mutex to the partition of the thread waiting for the mutex which, of all the threads waiting for the mutex, is most likely to run next. The scheduler may also begin billing the run time of any thread deemed to be working on behalf of the thread holding the mutex to the partition. The waiting thread, which may be waiting for the same mutex as the current thread holding the mutex, may be determined to be "most likely to run next" at block 1010. At block 1020, the operating system may raise the priority level of the thread holding the mutex to the priority of the waiting thread which is most likely, of all the waiting threads, to run next. The current thread holding the mutex may be charged the waiting time to the holding thread's CPU budget until the holding thread's CPU budget is exhausted (reaches zero) 1030. At block 1040, the holding thread's remaining CPU time is charged to the partition of the waiting thread most likely to run next.

The thread "most likely to run next" may be computed by applying, pairwise, a "compare two threads" algorithm repeatedly on pairs of threads in the list of waiting threads. The "compare two threads" algorithm is executed as follows, where A and B are the two threads to be compared: A function f(ap) is constructed, which includes the ordered triplets(x,y,z). A first value (determined by x=highest_priority_thread (ap).is_critical OR has_budget(ap)) determines if the highest priority thread in the adaptive partition is critical or the adaptive partition has CPU budget. A second value (determined by=highest_priority_thread(ap).prio) determines if the thread is the highest priority thread in the adaptive partition. A third value (z=1-relative_fraction_used(ap)), determines whether there is any remaining relative fraction of CPU budget remaining for the adaptive partition. This is the same ordering function f(ap) constructed for use in method 800 above. Then, let partition_of(X) mean the partition containing the thread X. Then, if f(partition_of(A))>f(partition_of (B), thread A is more likely to run than thread B. The ordering of the triplets (x,y,z) is defined numerically, with x being more significant than y or z, and y being more significant than z, to create an order of significance for the first, second, and third values (x, y, and z). The function f(X) is constructed for each thread to be compared until the thread with the highest f(X) is determined. The thread with the highest f(X) may be determined to be the "thread most likely to run next" and may be charged accordingly for waiting for the mutex.

Designing a System with Adaptive Partition Scheduling

The adaptive partition scheduler is typically used to solve two problems: 1) engineering a system to work properly in overload; and 2) preventing low-importance, or untrusted applications, from monopolizing the system. In either case, the parameters for the adaptive partition scheduler may need to be configured with the whole system in mind. To engineer a system for adaptive partition scheduling, there are four basic decisions:

How many adaptive partitions are there and what software goes into each?

What is the guaranteed CPU percentage of each adaptive partition?

What is the critical budget, if any, of each adaptive partition?

What is the size, in milliseconds, of the time-averaging window?

How to Choose Adaptive Partitions and Their Contents

It may be desirable to put functionally-related software into the same adaptive partition. Frequently, that is the right choice. However, adaptive partition scheduling is a structured way of deciding when not to run software. Therefore, the actual criterion for separating software into different adaptive partitions is: separate software into different adaptive partitions if they should be starved of CPU time under different circumstances. For example, suppose the system is a packet router with the applications of: routing packets; collecting and logging statistics for packet routing; route-topology protocols with peer routers; and collecting logging and route-topology metrics. It may seem reasonable to have two adaptive partitions: one for routing and one for topology. Certainly, logging routing metrics is functionally related to packet routing. However, when the system is overloaded, i.e., there is more outstanding work than the machine may possibly accomplish, the system may need to decide what work to run slower. In this example, when the router is overloaded with incoming packets, it is still important to route packets. But it may be reasonably decided that if there are not resources for both, it is preferable to route packets than collect routing metrics. It also may be reasonable to conclude that route-topology protocols should still run, using much less of the machine than routing itself, but running quickly when it needs to. Such an analysis would lead to three adaptive partitions:

an adaptive partition for routing packets, with a large share, say 80%;

an adaptive partition for topology protocols, for example 15%, but with maximum thread priorities higher than packet routing;

an adaptive partition, of 5%, for logging of both routing metrics and topology-protocol metrics.

In this case, the functionally-related components of routing and logging routing metrics may be separated, because it is preferable to "starve" just one if forced to "starve" something. Similarly, two functionally unrelated components, routing metric logging and topology metric logging may be grouped, and chosen to "starve" under the same circumstances.

How to Choose CPU percentages for Each Adaptive Partition

In choosing percentages for each adaptive partition, the first step is to measure the CPU time each adaptive partition would like to use under normal loads. If the application is a transaction processor, it may be useful to measure CPU consumption under a few different loads and construct a graph of offered load to CPU consumed. To properly configure the adaptive partition scheduler, application system designers may also need to:

load up the system;

measure CPU usage and application latencies under various loads;

measure latencies when the system is overloaded;

set adaptive partition shares to get the desired latencies.

Setting Budgets for Resource Managers

Ideally, resource managers, such as file systems, run with a budget of zero. This way they would always be billing time to their clients. However, sometimes device drivers find out too late which client a particular thread has been working for. In addition, some device drivers may have background threads (e.g. for audits or maintenance) that require budget that cannot be attributed to a particular client. In those cases, the system designer may measure the resource manager's background and unattributable loads and add them to the resource manager's adaptive partition's budget.

Choosing the Window Size

Designers who change the timeslice of the system may do so before defining the adaptive partition scheduler's window size. The time-averaging window size may be set from 8 ms to 255 ms. This is the time over which the scheduler tries to balance adaptive partitions to their guaranteed CPU limits. Additional effects of choosing this windowsize are:

A short window size reduces the accuracy of CPU time-balancing. The error is +/−one timeslice/windowsize.

A short window means that partitions that exhaust their budgets because other partitions are using less than their guaranteed percentage may not have to pay the time back.

In an extreme case, a long window size may cause some adaptive partitions to experience runtime delays. The delays are never longer than the windowsize. For example, if two adaptive partitions have one thread, both at priority 10, both threads are always ready to run, the groups have guaranteed CPU percentages of 90% and 10%, and the windowsize is 100 ms. Then, the scheduler will schedule the 10% adaptive partition roughly every 9 timeslices. However, if the 90% adaptive partition sleeps for 10 ms, the 10% adaptive partition will spend its entire budget during those 10 ms. Subsequently, the 10% partition will run only at intervals of every 90 ms. However, this pattern only occurs if the 10% partition never suspends (which is exceedingly unlikely) and if there are no threads of other priorities (also exceedingly unlikely).

The methods described above may be configured to run in a transaction processing system in an event of an overload in processing capacity, where it is more important to continue to process some fraction of the offered load rather to fail completely. Examples of such applications include Internet routers and telephone switches. The methods may be configured to run in other real-time operating system environments, such as automotive and aerospace environments, where critical processes may be designated that need to be executed at critical events. An example may be in an automotive environment, where an airbag deployment event is a low probability event, but must be allocated processor budget should the event be initiated. As such, the methods may be configured to operate within an automobile control operating system.

The methods may be configured to operate in an environment where untrusted applications may be in use. In such situations, applications such as Java applets may be downloaded to execute in the operating system, but the nature of the application may allow the untrusted application to take over the system and create an infinite loop. The operating system designer will not want such a situation, and will create appropriate adaptive partitions so the untrusted application may be run in isolation, while limiting access to CPU time which other processes will have need of.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system comprising:
   a processor;
   one or more memory storage units;
   software code stored in the one or more memory storage units, where the software code is executable by the processor and comprises:
      a plurality of adaptive partitions each having a respective guaranteed processor time budget and one or more process threads;
      a plurality of process threads each having a priority and each belonging to any one of the plurality of adaptive partitions; and
      a process scheduler executable by the processor configured to:
         when the system is under a normal load, allocate the processor to a process thread, of the plurality of process threads, that is ready for execution and having the highest priority amongst process threads, of the plurality of process threads, that are ready for execution; and
         when the system is in overload, allocate the processor to a process thread, of the plurality of process threads, that is ready for execution, having the highest priority amongst process threads, of the plurality of process threads, that are ready for execution and for which the adaptive partition having the process thread has an available guaranteed processor time budget.

2. The system of claim 1, where the guaranteed processor time budget of each of the plurality of adaptive partitions is dynamic and can be reallocated while the system executes.

3. The system of claim 1, where the guaranteed processor time budget is allocated and billed over successive averaging windows; and where a portion of the guaranteed processor time budget of each adaptive partition is billed when the processor is allocated to a process thread belonging to the respective adaptive partition.

4. The system of claim 3, where the system is in overload when the processor cannot be allocated to all of the process threads that are ready for execution over the duration of one averaging window, of the successive averaging windows, and where the system is under normal load otherwise.

5. The system of claim 1, where the process thread to which the processor is allocated runs until the process thread is finished, is blocked, or the guaranteed processor time budget of the adaptive partition having the process thread is exhausted.

6. The system of claim 1, where the process thread to which the processor is allocated further runs until the process thread is preempted and the processor is allocated to another process thread, of the plurality of process threads, that is ready for execution and that has a priority higher than the priority of the process thread to which the processor is currently allocated.

7. The system of claim 1, where a process thread, of the plurality of process threads, is ready for execution when the process thread is any of: in a ready state and in a ready queue.

8. A method of scheduling a plurality of process threads, each having a priority, for execution by a processor of a system, the method comprising:
   creating a plurality of adaptive partitions each having a respective guaranteed processor time budget;
   assigning one or more process threads from the plurality of process threads to each of the plurality of adaptive partitions;
   when the processor is under a normal load, allocating the processor to a process thread, of the plurality of process threads, that is ready for execution and having the highest priority amongst process threads, of the plurality of process threads, that are ready for execution; and
   when the processor is in overload, allocating the processor to a process thread, of the plurality of process threads, that is ready for execution, having the highest priority amongst process threads, of the plurality of process threads, that are ready for execution state and for which the adaptive partition having the process thread has an available guaranteed processor time budget.

9. The method of claim 8, where the guaranteed processor time budget of each of the plurality of adaptive partitions is dynamic and can be reallocated while the system executes.

10. The method of claim 8, where the guaranteed processor time budget is allocated and billed over successive averaging windows; and where a portion of the guaranteed processor time budget of each adaptive partition is billed when the processor is allocated to a process thread belonging to the adaptive partition.

11. The method of claim 10, where the system is in overload when the processor cannot be al located to all of the process threads that are ready for execution over the duration of one averaging window, of the successive averaging windows, and where the system is under normal load otherwise.

12. The method of claim 8, where the process thread to which the processor is allocated runs until the process thread is finished, is blocked, or the guaranteed processor time budget of the adaptive partition having the process thread is associated is exhausted.

13. The method of claim 8, where the process thread to which the processor is allocated further runs until the process thread is preempted and the processor is allocated to another process thread, of the plurality of process threads, that is ready for execution and that has a priority higher than the priority of the process thread to which the processor is currently allocated.

14. The method of claim 8, where a process thread, of the plurality of process threads, is ready for execution when the process thread is any of: in a ready state and in a ready queue.

* * * * *